April 20, 1943. H. T. FARR 2,316,850
ALIGNMENT GAUGE
Filed July 28, 1942 2 Sheets-Sheet 1
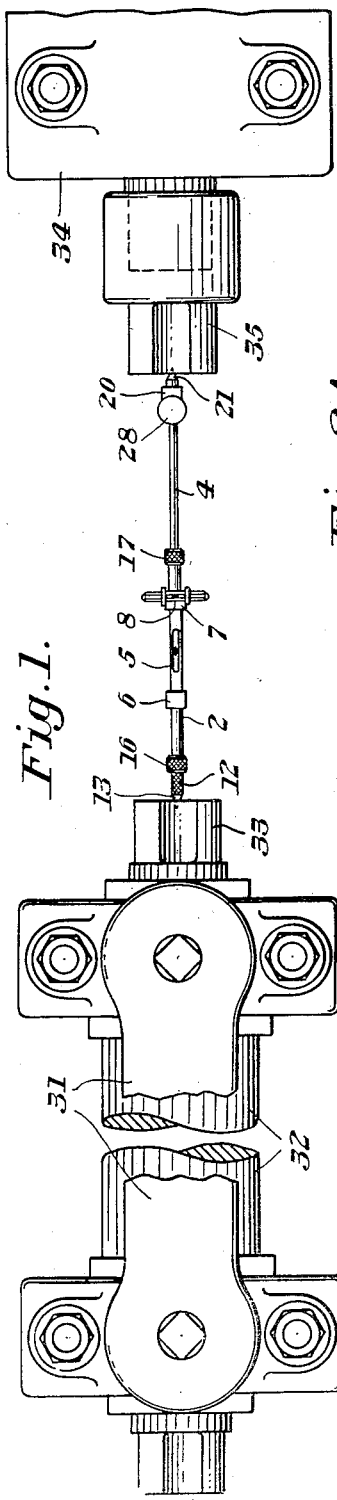
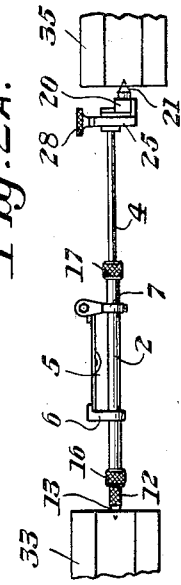
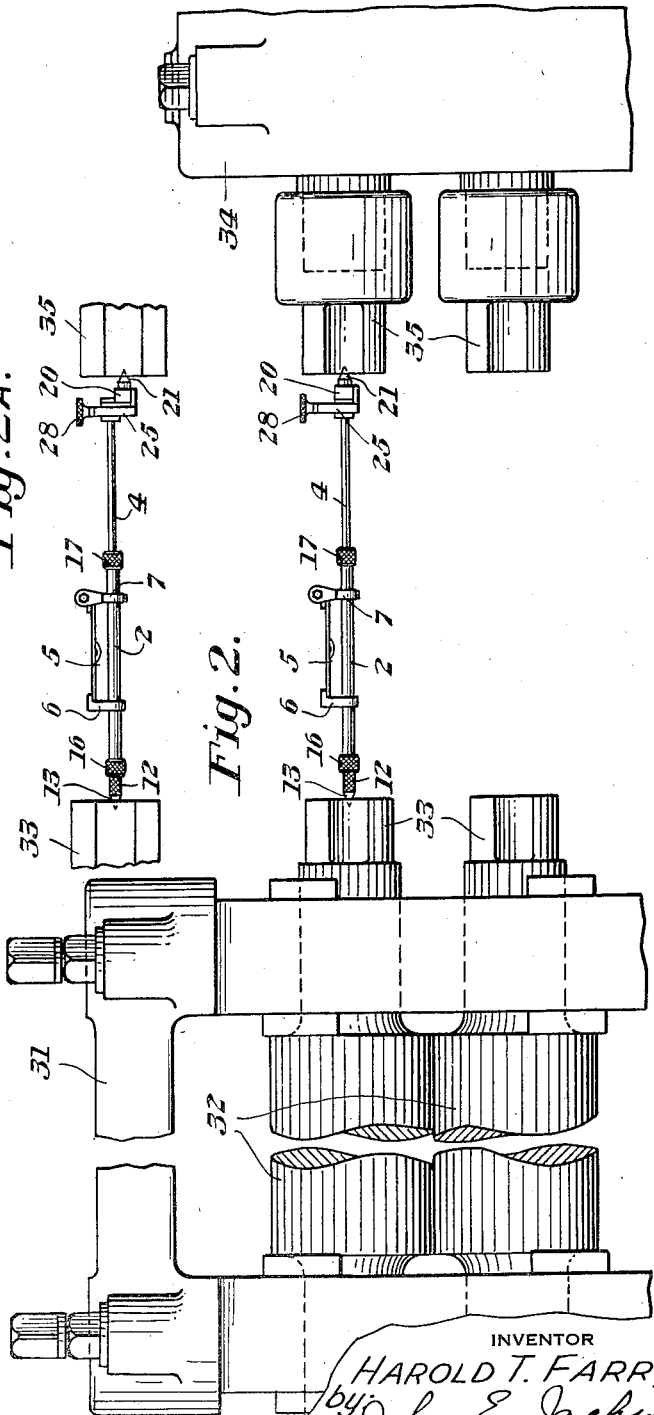
INVENTOR
HAROLD T. FARR,
by John E. Jackson
his Attorney.

April 20, 1943. H. T. FARR 2,316,850
ALIGNMENT GAUGE
Filed July 28, 1942 2 Sheets-Sheet 2
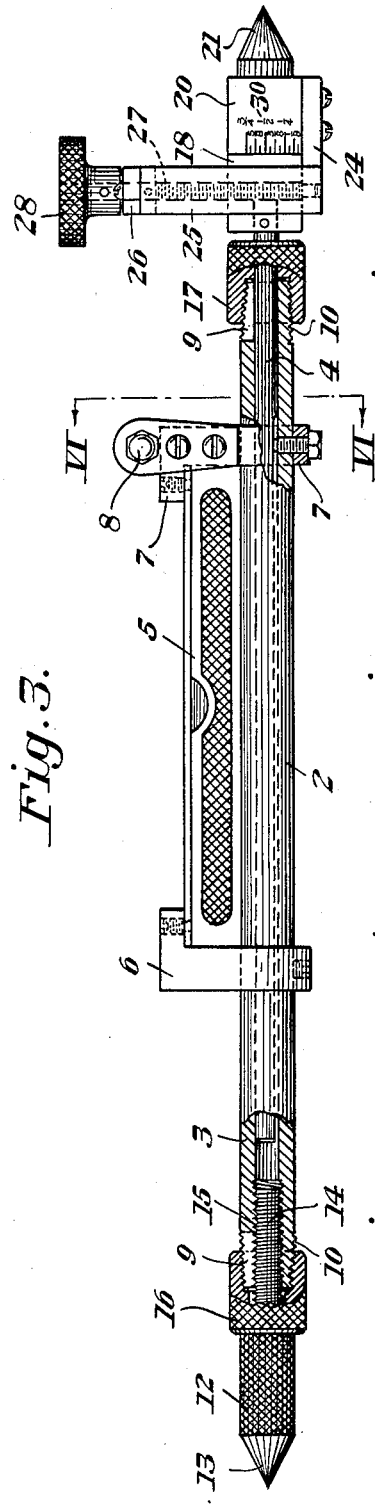
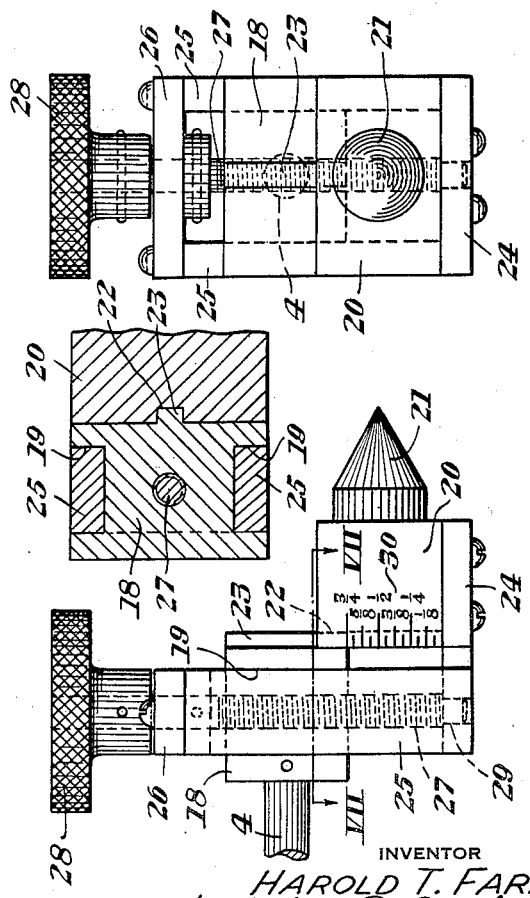
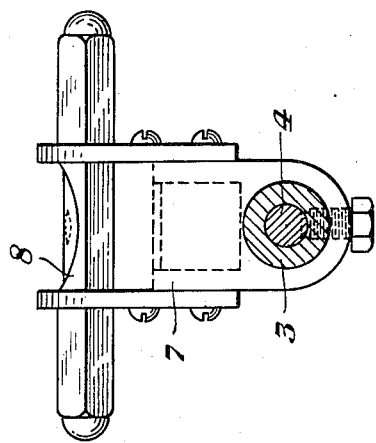
INVENTOR
HAROLD T. FARR,
by: John E. Jackson
his Attorney.

Patented Apr. 20, 1943

2,316,850

UNITED STATES PATENT OFFICE 2,316,850

ALIGNMENT GAUGE

Harold T. Farr, Cleveland, Ohio, assignor to The American Steel and Wire Company of New Jersey, a corporation of New Jersey Application July 28, 1942, Serial No. 452,643

9 Claims. (Cl. 33—84)

This invention relates to gauges and particularly to an improved gauge for aligning rolls and pinions, and the like.

In rolling mills as used in the steel industry, it is important that the pitch of the spindles connecting the driving pinion and the roll to be driven be equalized in order to avoid undue wear on the muffs and spindles. In other words, it is desirable that the rolls and pinions of the mill be in true alignment with each other in order to eliminate wear on the interconnecting driving mechanism. Heretofore, the rolls and pinions of rolling mills were aligned by means of a transit. Such procedure was not only slow and tedious but it required the services of a surveyor in order to obtain an accurate alignment and, consequently, was expensive and not altogether satisfactory.

In the present invention there is provided a gauge for aligning the rolls and pinions whereby the same may be quickly and accurately aligned with each other thereby eliminating the above-mentioned disadvantages.

Accordingly, it is the general object of the present invention to provide an improved gauge for aligning rolls and pinions which is simple and inexpensive in its construction, and at the same time, a gauge which is efficient and effective in its use.

It is another object of the invention to provide an improved gauge for aligning rolls and pinions which is flexible in its use and one which may be easily and conveniently adjusted for use in aligning rolls and pinions whose distances apart vary over a relatively wide range.

It is a further object of this invention to provide an improved gauge for aligning rolls and pinions which has means arranged therewith for indicating the amount the rolls and pinions are out of alignment with each other.

Various other objects and advantages of this invention will become more apparent during the course of the following specification and will be particularly pointed out in the appended claims.

In the accompanying drawings there is shown for the purpose of illustration, one embodiment which my invention may assume in practice.

In the drawings:

Figure 1 is a plan view of a portion of a rolling mill together with its drive pinion showing the use of the improved gauge of the present invention for aligning the rolls and pinions of the mill;

Figure 2 is a front elevational view of Figure 1;

Figure 2a is a view of the end of the roll and the end of the pinion together with my improved gauge showing the position it assumes when the roll and pinion are out of alignment;

Figure 3 is a side elevational view, partly in section of the improved alignment gauge of my invention;

Figure 4 is a side elevational view of the means arranged on one end of my gauge for adjusting the position of one of the centers showing the position the center assumes when it is out of alignment;

Figure 5 is an end view of Figure 4;

Figure 6 is a sectional view taken on line VI—VI of Figure 3; and

Figure 7 is a sectional view taken on line VII—VII of Figure 4.

Referring more particularly to Figures 3 through 7 of the drawings, the improved gauge of my invention comprises a longitudinally extending body member 2 which consists of a tubular member 3 and a rod-like member 4. The rod-like member 4 is disposed within the tubular member 3 so that the same are arranged telescopically relative to each other. On top of the tubular member 3 there is arranged a spirit level 5 which extends longitudinally thereof and which is mounted on brackets 6 and 7 carried by the tubular member. At ane end of the level 5 on the bracket 7 there is mounted another spirit level 8 which is arranged substantially perpendicular to the longitudinal axis of the body member.

Each end of the tubular member 3 is split as at 9 from the end to a point spaced therefrom. At each end of the tubular member 3, there is arranged an outer threaded portion 10. On the outer free end of the tubular member 3 there is positioned a knurled center member 12 having a point 13, and on the inner end thereof there is arranged a threaded portion 14 which extends into the outer end of the tubular member 3 and cooperates with an interiorly threaded portion 15 thereof. There is disposed on the outer threaded portion 10 at that end of the tubular member 3, a knurled lock nut member 16, and on the other end thereof a similar knurled lock nut member 17 is positioned.

On the outer free end of the rod-like member 4 there is mounted a guide block 18 having vertically extending guide grooves 19 arranged along the outer sides thereof. There is arranged with the guide block 18 a movable block-like member 20 having a center member 21 suitably arranged therein and extending outwardly therefrom. There is arranged centrally of the block-like member 20 on the inner side thereof, a vertically extending groove 22 which is adapted to cooperate with a vertically extending tongue 23 disposed on the outer end of the guide block 18. With the block-like member 20 there is arranged a bracket member 24 having upwardly extending opposed arm-like members 25 which straddle the guide block 18 and which are disposed in the guide grooves 19 thereof. On the upper end of the arm-like members 25 there is disposed a yoke-like cross member 26 which is adapted to act as a support and bearing for a vertically arranged screw 27. On the upper end of the screw 27, there is arranged a knurled portion 28. The shaft of the screw extends downwardly through a hole in the guide block 18 and the lower end of the screw is journalled in the bracket member 24 as at 29. The hole in the guide block 18 through which the screw 27 extends is threaded and the threads therein cooperate with the threaded portion of the screw 27 so as to move the block-like member 20 upon rotative movement of the screw. On one side of the block-like member 20 there is arranged a series of graduations or calibrations 30 with the zero calibration thereof adapted to coincide with the lower edge of the guide block 18 when the center 21 carried by the guide block 20 is in axial alignment with the center 12 disposed on the opposite end of the body member 2.

The improved gauge of my invention is used in the following manner. For the purpose of illustration there is shown in Figures 1 and 2 of the drawings a rolling mill 31 having rollers 32. There is arranged on one end of each of the rolls a neck 33. Directly opposite the neck of the rolls there is arranged a pinion housing 34 in which there is disposed pinions 35 for driving the rolls 32 of the mill. To align any particular roll 32 of the mill with its respective pinion 35 the improved gauge of my invention is positioned between the pinion and the end of the roll so that the center 12 on one end of the gauge is positioned in the center of the roll and the center 21 on the opposite end of the gauge is positioned in the center of the pinion 35. To adjust the length of the gauge so that it is of the proper length to fit between the end of the roll and the pinion, the lock nut 17 is turned so as to loosen the same in order to permit free telescopic movement of the rod-like member 4 relative to the tubular member 3. The rod-like member and tubular member are then moved telescopically relative to each other so as to adjust the gauge to the proper length in order that the gauge will fit between the roll and pinion. The centers 12 and 21 are then positioned in the centers of the roll and the pinion and the lock nut 17 is tightened whereby the split end of the tubular member is forced inwardly around the rod-like member so that the same are locked in relation to each other, so as to prevent unintentional movement of the rod-like member relative to the tubular member. Further adjustment may be had in order to secure a snug fit between the centers by loosening the lock nut 16 on the opposite end of the tubular member 3. The center 12 on that end of the tubular member is then rotated so that the center moves outwardly. That is, the center 12 is screwed outwardly. After the desired fit has been obtained the lock nut 16 is tightened so that the outer split end of the tubular member is forced inwardly against the threaded portion 14 of the center so as to prevent unintentional movement thereof relative to the tubular member.

The gauge is then revolved between the centers until the level 8 carried thereby indicates the vertical position of the upwardly extending arm-like members 25 carried by the block-like member 20. With the gauge securely held in such position, level 5 is noted. If this level does not show a true horizontal position the centers are out of alignment with each other. If such misalignment exists the screw 27 is turned by means of the knurled handle portion 28 so as to move the block-like member 20 relative to the guide block 18 and the remainder of the gauge. The screw 27 is turned until the level 5 shows a true horizontal position. When the level 5 denotes such horizontal position, as shown in Figure 2a of the drawings, the calibrations on the side of the block 20 are noted and the calibration opposite the lower edge of the guide block 18 will indicate the amount the pinion 35 is out of alignment with the roll 32. In other words, the misalignment can be read directly from the graduations or calibrations on the side of the block-like member 20. Such misalignment of the roll and pinion is then corrected in any suitable manner. After the amount of misalignment has been noted the knurled nut 17 is loosened so as to permit telescopic movement of the rod-like member 4 relative to the tubular member 3, the rod-like member is forced into the tubular member 3 and the gauge is removed from its position from between the roll and the pinion. The same procedure is followed for aligning other rolls of the mill and their respective drive pinions.

As a result of my invention it will be seen that there is provided a gauge or instrument for aligning the rolls of the rolling mill and their drive pinions which will not only indicate when the rolls and pinions are out of alignment but will also indicate directly the amount of such misalignment. With the use of this gauge it will be seen that the rolls and pinions may be aligned in a minimum amount of time without the use of other instruments or expensive equipment. Furthermore, it will be seen that the gauge of my invention can be used by an ordinary workman or mill operator without the need of a surveyor or other skilled help.

While I have shown and described one specific embodiment of my invention, it will be understood that this embodiment is merely for the purpose of illustration and description and that various other forms may be devised within the scope of my invention, as defined in the appended claims.

I claim:

1. A gauge of the class described comprising a longitudinally extending body member, a center arranged on each end of said body member, a spirit level carried by said body member which is arranged substantially parallel to the longitudinal axis thereof, another spirit level carried by said body member which is arranged substantially perpendicular to the longitudinal axis of said body member, and means arranged on one end of the said body member for adjusting the position of the center at that end of the body member transversely of the same.

2. A gauge of the class described as defined in claim 1, including means arranged on the opposite end of the body member for adjusting the center on that end of the body member longitudinally thereof.

3. A gauge of the class described as defined in claim 1, wherein the longitudinally extending body member consists of a pair of members which are telescopically arranged relative to each other.

4. A gauge of the class described comprising a longitudinally extending body member consisting of a rod-like member which is telescopically arranged within a tubular member, a center arranged on the outer free ends of both the rod-like member and the tubular member, a spirit level carried by said body member intermediate the length thereof and which is arranged substantially parallel to the longitudinal axis thereof, another spirit level carried by said body member which is arranged substantially perpendicular to the longitudinal axis of said body member, means arranged on one end of said body member for adjusting the position of the center on that end of the body member transversely of the same, and means arranged on the opposite end of said body member for adjusting the position of the center on that end of the body member longitudinally thereof.

5. A gauge of the class described comprising a longitudinally extending body member, a center arranged on each end of said body member, a spirit level carried by said body member which is arranged substantially parallel to the longitudinal axis thereof, another spirit level carried by said body member which is arranged substantially perpendicular to the longitudinal axis of said body member, a block-like member movably mounted on one end of said body member in which the center on that end is disposed, means for moving said block-like member relative to the body member so that the block-like member together with the center carried thereby may be moved transversely of said body member, and means carried by said block-like member for indicating the amount of such movement.

6. A gauge of the class described as defined in claim 5, including a threaded portion carried by the inner end of the center on the opposite end of the body member which is adapted to cooperate with a threaded portion arranged on that end of the body member whereby the center may be adjusted longitudinally of the body member, and a lock nut arranged on that end of the body member for locking the center in position relative to the body member so as to prevent unintentional movement of the center relative to the body member.

7. A gauge of the class described comprising a longitudinally extending body member consisting of a rod-like member which is telescopically arranged within a tubular member, a center arranged on the outer free ends of both the rod-like member and the tubular member, a spirit level carried by said tubular member intermediate the length thereof and which is arranged substantially parallel to the longitudinal axis thereof, another spirit level carried by said tubular member which is arranged substantially perpendicular to the longitudinal axis of the body member, means arranged on the outer end of the rod-like member for adjusting the center carried thereby in a direction transversely thereof, and means arranged on the outer end of the tubular member for adjusting the center carried thereby longitudinally thereof.

8. A gauge of the class described as defined in claim 7, including means for locking together the rod-like member and the tubular member so as to prevent unintentional telescopic movement of the same relative to each other.

9. A gauge of the class described as defined in claim 7, wherein the means arranged on the outer end of the rod-like member for adjusting the center carried thereby in a direction transversely thereof consists of a block-like member movably mounted on the end of the rod-like member in which the center is disposed, a thumbscrew carried by the rod-like member for moving the block-like member together with the center carried thereby transversely of the rod-like member.

HAROLD T. FARR.